(12) United States Patent
Haspel

(10) Patent No.: US 7,229,114 B2
(45) Date of Patent: Jun. 12, 2007

(54) STOWAGE DEVICE FOR A LUGGAGE SPACE OF A MOTOR VEHICLE

(75) Inventor: Klaus Haspel, Rottenburg (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/444,038

(22) Filed: May 31, 2006

(65) Prior Publication Data

US 2006/0273611 A1    Dec. 7, 2006

(30) Foreign Application Priority Data

Jun. 1, 2005    (DE)   ................... 10 2005 026 670

(51) Int. Cl.
*B60R 7/00*    (2006.01)
(52) U.S. Cl. ............... 296/37.16; 296/24.44
(58) Field of Classification Search ........... 296/24.44, 296/37.1, 37.16; 224/42.32, 42.33, 42.35, 224/281, 400, 548, 564; 292/80, 87, 91, 292/277, DIG. 2; 108/26, 44; 248/220.41, 248/222.51, 222.52, 243
See application file for complete search history.

(56) References Cited

U.S. PATENT DOCUMENTS

| | | | | |
|---|---|---|---|---|
| 2,091,070 A | * | 8/1937 | Girl | 414/462 |
| 2,483,478 A | * | 10/1949 | Smelker | 135/88.14 |
| 2,490,014 A | * | 12/1949 | De Villiers Brand | 296/26.09 |
| 2,867,471 A | * | 1/1959 | Coon, Jr. | 296/156 |
| 2,934,248 A | * | 4/1960 | Lown | 224/542 |
| 2,953,287 A | * | 9/1960 | Werner | 224/496 |
| 3,002,665 A | * | 10/1961 | Allen | 224/540 |
| 3,338,620 A | * | 8/1967 | Cauvin | 296/37.14 |
| 3,726,422 A | * | 4/1973 | Zelin | 414/522 |
| 4,193,649 A | * | 3/1980 | Sharon | 384/19 |
| 4,452,151 A | * | 6/1984 | Jarrard | 108/44 |
| 4,455,948 A | * | 6/1984 | Torres | 108/44 |
| 5,046,913 A | | 9/1991 | Domek et al. | |
| 5,669,537 A | | 9/1997 | Saleem et al. | |
| 5,855,310 A | | 1/1999 | Van Ert et al. | |
| 6,050,202 A | * | 4/2000 | Thompson | 108/44 |

(Continued)

FOREIGN PATENT DOCUMENTS

DE      44 42 042 A1    5/1996

(Continued)

OTHER PUBLICATIONS

European Patent Office Search Report dated Aug. 22, 2006 (7 pages).

(Continued)

*Primary Examiner*—D. Glenn Dayoan
*Assistant Examiner*—Paul Chenevert
(74) *Attorney, Agent, or Firm*—Flynn, Thiel, Boutell & Tanis, P.C.

(57) ABSTRACT

A stowage device for a luggage space of a motor vehicle having a container which is mounted such that it is moveable by guide means between a rest position and a stowage position is known.

Figure 1:
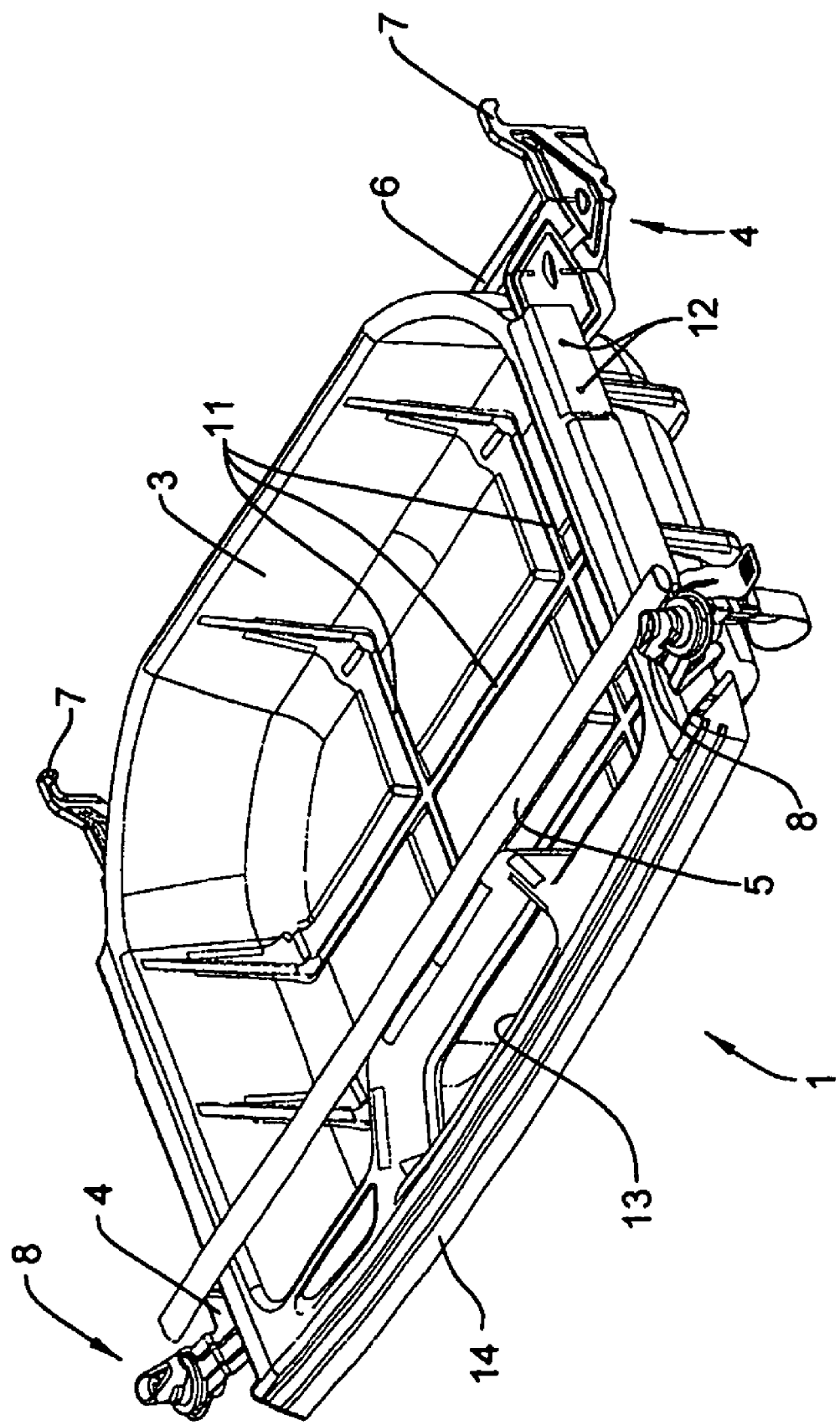

According to the invention, the guide means and the container are arranged on a frame module which can be detachably mounted on a wall section of the luggage space by fastening means which can be operated without tools.

Use for passenger vehicles.

11 Claims, 5 Drawing Sheets

U.S. PATENT DOCUMENTS

| | | | |
|---|---|---|---|
| 6,076,908 A * | 6/2000 | Maffeo | 312/334.7 |
| 6,338,518 B1 * | 1/2002 | D'Annunzio et al. | 296/37.8 |
| 6,546,598 B1 * | 4/2003 | Nakanou et al. | 224/281 |
| 6,832,799 B2 | 12/2004 | Haspel et al. | |
| 6,923,354 B2 * | 8/2005 | Axelson | 224/404 |
| 7,052,066 B2 * | 5/2006 | Emery et al. | 296/37.1 |
| 2004/0217616 A1 | 11/2004 | Haspel et al. | |
| 2006/0284038 A1 * | 12/2006 | Hartman et al. | 248/298.1 |

FOREIGN PATENT DOCUMENTS

| | | |
|---|---|---|
| DE | 197 21 877 A1 | 12/1997 |
| DE | 297 18 678 U1 | 3/1998 |
| DE | 101 12 272 A1 | 10/2001 |
| EP | 1 642 777 A1 | 4/2006 |
| FR | 2557517 A1 * 7/1985 | ................ 296/37.1 |

OTHER PUBLICATIONS

German Patent Office Search Report dated Jun. 1, 2005 (2 pages).

* cited by examiner

STOWAGE DEVICE FOR A LUGGAGE SPACE OF A MOTOR VEHICLE

The invention relates to a stowage device for a luggage space of a motor vehicle having a container which is mounted such that it is moveable by guide means between a rest position and a stowage position.

A stowage device of said type is known from DE 101 12 272 A1. The container disclosed there is embodied as a drawer which is arranged such that it can be displaced in a linearly moveable fashion in horizontal guides between a rest position and a stowage position in which the drawer can be loaded or unloaded. Corresponding guide rails for the drawer part are arranged in the luggage space such that they are fixed to the vehicle.

A further stowage device for a luggage space of a passenger vehicle is known from DE 44 42 042 A1, in which stowage device a container is arranged such that it is moveable between a rest position, which is arranged below a rear parcel shelf, and a stowage position which is offset in the direction of the luggage space opening. The container is embodied in the manner of a tray and can be displaced in a parallel fashion between the stowage position and the rest position by means of parallelogram guides. At least one gas spring assists the displacement movement from the rest position into the stowage position, in which corresponding stowage material can be removed or stowed.

It is an object of the invention to produce a stowage device of the type mentioned in the introduction which ensures variable usage possibilities of the luggage space.

Said object is achieved in that the guide means and the container are arranged on a frame module which can be detachably mounted on a wall section of the luggage space by fastening means which can be operated without tools. This makes it possible for the entire stowage device to be selectively positioned in or removed from the luggage space, so that the stowage volume of the luggage space can be varied depending on the type of stowage material which is to be transported. The fastening means which can be detached or fastened without tools permit extremely simple mounting and dismounting of the frame module, so that it can be mounted or dismounted not only by a specialist vehicle workshop but also by the vehicle customer. The frame module ensures high stability of the entire stowage device. The guide means can be embodied as linear guides or as guides of a different design such as curved guides, pivoting guides, combined linear and pivoting guides and the like.

In one embodiment of the invention, a top wall of the luggage space is provided as a wall section, to which top wall the frame module can be fastened from below. A body part which is fixedly integrated into the bodyshell structure is preferably provided as the top wall, which body part is also referred to as a rear parcel shelf and upwardly delimits the luggage space at least in sections. It is alternatively also possible to provide a moveable yet dimensionally stable top wall which can, for example, be pivoted upwards when opening a tailgate. It is particularly advantageous to fasten the frame module to a fixed top wall, as is provided in hatchback vehicles as an upper delimitation of the luggage space, adjacent to a luggage space rear lid. It is particularly advantageous to accommodate the stowage device in said upper region of the luggage space since the luggage space opening is not adversely affected by the container while the latter is in its rest position. The arrangement of the frame module and therefore of the container below the top wall of the luggage space also makes it possible to load the luggage space in the region of the base of the luggage space without interference from the frame module or container.

In a further embodiment of the invention, receiving regions are provided in the top wall, into which receiving regions the fastening means can be anchored in a positive-fitting manner. This allows the frame module to be mounted in a particularly stable and secure manner. The positive-fitting anchoring ensures that the frame module is fastened to the top wall permanently and without play.

In a further embodiment of the invention, the fastening means have a plurality of fastening elements which are spaced apart from one another and comprise at least one hanging hook and at least one clamping element, in particular a bayonet connection part. The frame module advantageously has two hanging hooks at opposite sides and, at a distance therefrom, two clamping elements, likewise at opposite sides. The hanging hooks are used to initially hang the frame module, in order to subsequently bring about the desired fixing of the frame module to the top wall by means of the at least one clamping element. The at least one clamping element serves to clamp the frame module in the mounted position in order to thus provide fixing without play, irrespective of vibrations or shaking movements, in particular during driving. A bayonet connection part, which fulfills the desired clamping and fixing function by means of a simple rotational movement, is particularly advantageously provided as a clamping element.

In a further embodiment of the invention, two hanging hooks are provided as a rear fastening element pair and two in particular rotatable clamping elements are provided as a front clamping element pair, said hanging hooks and clamping elements being designed such that fixing is provided without play in the mounted position. This embodiment is particularly advantageous for a frame module which is of approximately quadrangular design.

In a further embodiment of the invention, the guide means are designed as telescopically extendable guide rails. The container can thus be pulled out or be returned to the rest position in a linearly moveable fashion and consequently functions as a drawer.

In a further embodiment of the invention, the frame module has a framework composed of two longitudinal members, on which the guide rails are arranged, and of two transverse members, which are arranged in the region of the rear fastening element pair and in the region of the front clamping element pair. A particularly stable design of the frame module is obtained in this way. The framework is preferably constructed from light metal sections in order to keep the weight of the stowage device low.

In a further embodiment of the invention, a luggage space lamp, which illuminates the interior of the container when the latter has been moved into the stowage position, is provided in the region of the top wall. This advantageously makes illumination of the stowage device possible without it being necessary to provide a separate illumination device for the stowage device.

In a further embodiment of the invention, the container is provided with a cut-out region which, when the container is in the rest position, is positioned in alignment below the luggage space lamp in such a way that the light of the luggage space lamp shines down through the cut-out region into the luggage space. With this embodiment, the container does not cover the luggage space lamp when in its rest position, so that in the rest position, there is sufficient illumination of the luggage space, in the same way as if the stowage device were removed from the luggage space.

In a further embodiment of the invention, the container is designed as a plastic tray which is provided, at least in its base region, with a plurality of transversely and longitudinally running ribs. As a result, the plastic tray has a high degree of stiffness and can therefore increase the stability of the entire arrangement comprising the frame module, guide means and container.

In a further embodiment of the invention, the cut-out region is arranged in a plastic tray edge region which is at the front in the pulling-out direction, and the cut-out region is embodied as a handle region for manually gripping the plastic tray. The cut-out region therefore performs a dual function, since, in addition to light guidance, it also fulfills a handle function for manually pulling out or pushing in the container.

In a further embodiment of the invention, the plastic tray is provided at the front with an end faceplate which is in particular an integral part of the plastic tray. As a result, the stowage device can be integrated into the luggage space in a visually appealing manner.

Further advantages and features of the invention will emerge from the claims and from the following description of a preferred exemplary embodiment of the invention which is illustrated in the drawings.

Figure 2:
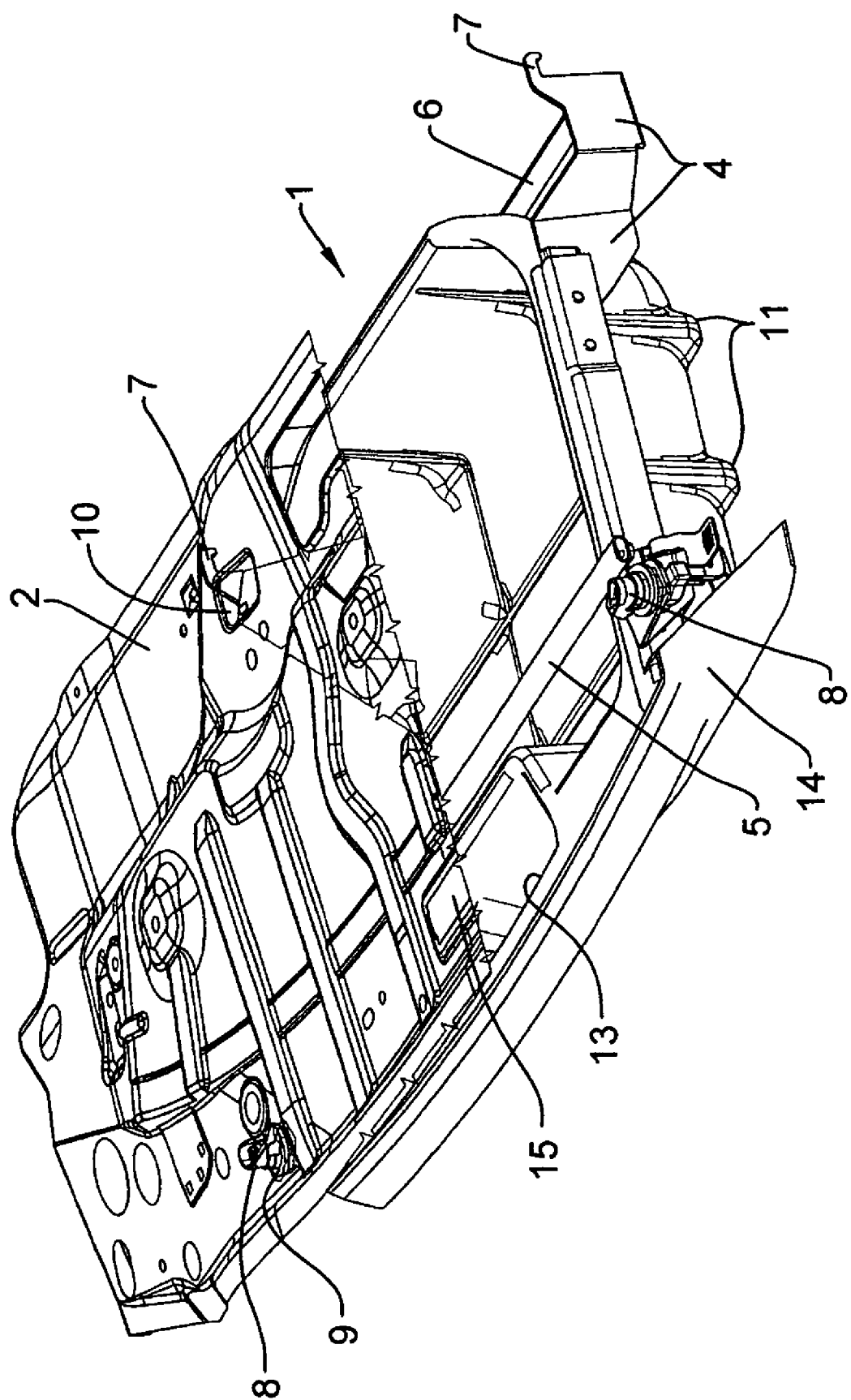
Figure 3:
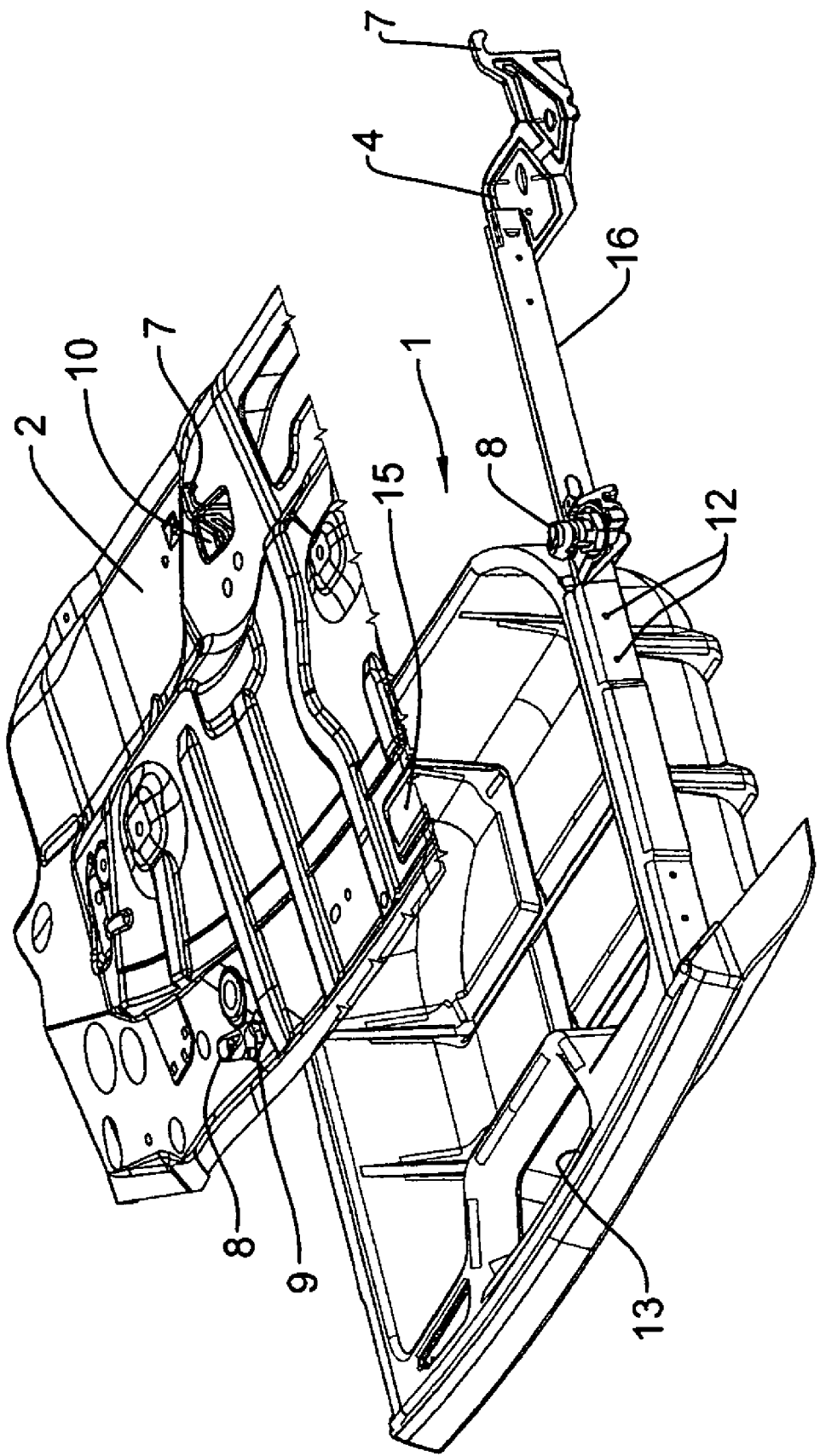
Figure 4:
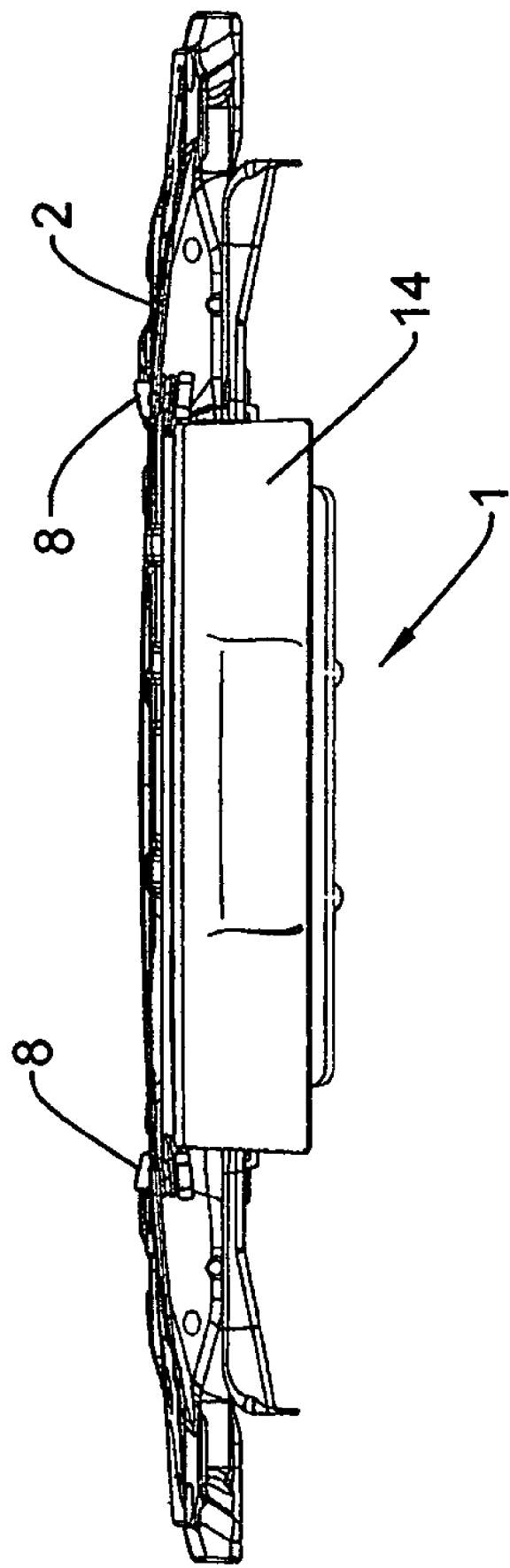
Figure 6:
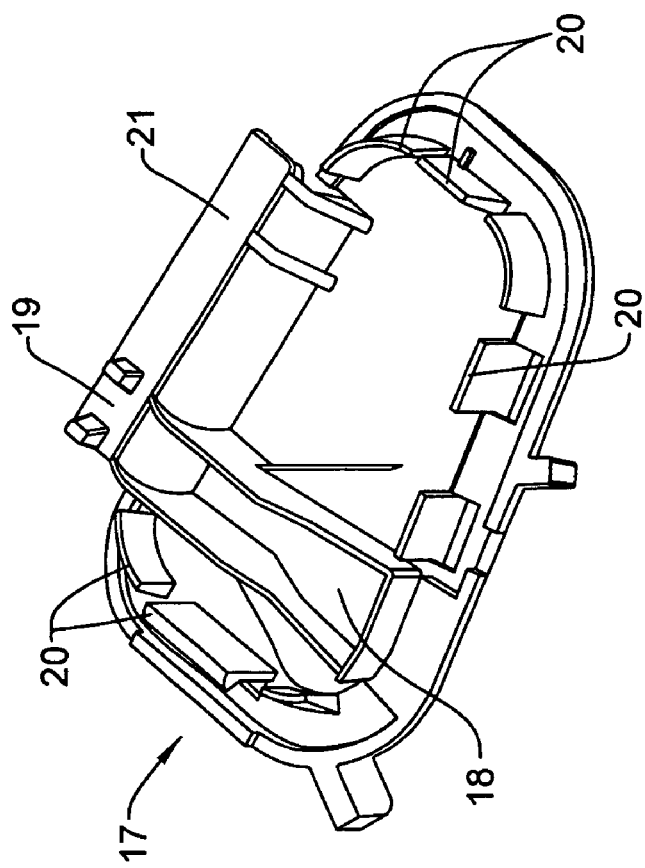
Figure 5:
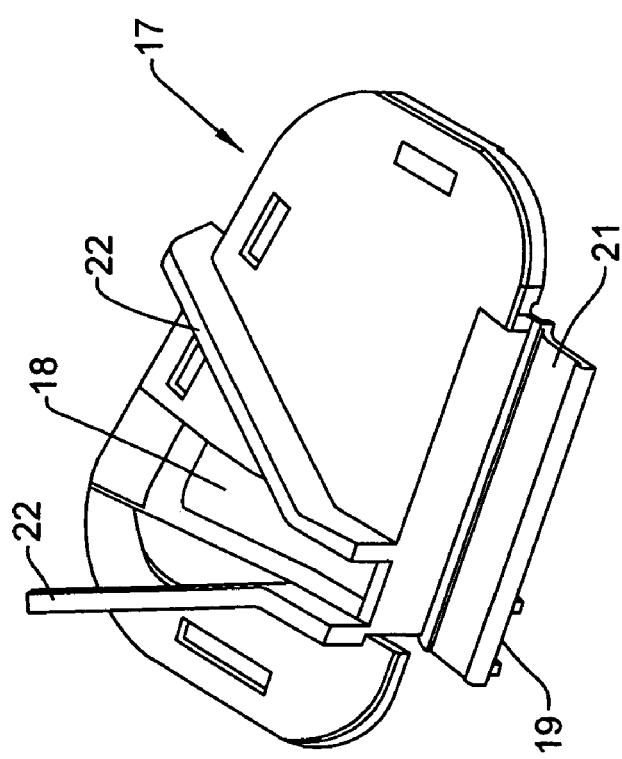

FIG. 1 is a perspective illustration of an embodiment of a stowage device according to the invention, the container being in its rest position, FIG. 2 shows the stowage device from FIG. 1, it being possible to see the arrangement of the stowage device below a luggage space top wall which is fixed to the vehicle, FIG. 3 shows the stowage device from FIG. 2, the container being in its stowage position, FIG. 4 shows a rear view of the stowage device from FIGS. 1 to 3, FIG. 5 shows an insert part for a receiving region in the top wall which allows a hanging hook of the stowage device to be inserted and secured and FIG. 6 is an illustration of the insert part from FIG. 5 rotated through 180°.

A stowage device according to FIGS. 1 to 6 is provided for a luggage space of a passenger vehicle. The luggage space is delimited in a fundamentally known way at the bottom by a luggage space base and at the top by a luggage space lid and, adjacent to the luggage space lid in the longitudinal direction of the vehicle, by a top wall 2. The top wall 2 is formed by a bodyshell part which is fixedly integrated into the bodyshell structure. As can be seen in FIGS. 2 and 3, the top wall 2, which is fixed to the vehicle, is provided with two receiving regions 10, which are spaced apart from one another in the vehicle transverse direction and are at the front in the normal orientation of the vehicle, and with two rear receiving regions 9, which are formed by passages in the top wall 2. The front receiving regions are of approximately quadrangular design. The rear receiving regions 9 have an approximately oval passage opening. In FIGS. 2 and 3, only one of the receiving regions 10 and one of the rear receiving regions 9 is illustrated, as the top wall 2 is partially cut away to reveal the stowage device 1 below. As per FIGS. 5 and 6, a respective insert part 17 can be inserted into each front receiving region, said insert part 17 being provided with an insertion web 21 and a plurality of latching webs 20 which run along the edge contour of the corresponding receiving region 10 and allow the insert part 17 to latch into the corresponding receiving region 10. The respective insert part 17 is inserted into the corresponding receiving region 10 from below, that is to say from the luggage space, and latches into said receiving region 10 simply by being pressed in. The two insert parts 17 for the front receiving regions 10 serve to allow hanging hooks of a frame module 4, 5, 6 of the stowage device to be inserted and secured in the way which is described in the following.

The stowage device 1 has a plastic tray 3 which is fastened at its opposing longitudinal sides by fastening means 12, and by means of in each case one guide rail arrangement 16, to the frame module 4 to 6 in a linearly displaceable fashion. The frame module 4 to 6 has two longitudinal member sections 4 which run parallel to the guide rail arrangements 16 and are connected to one another in a stable fashion by means of two transverse members 5, 6 to form a quadrangular frame. A front transverse member 6 runs at approximately the level of the front hanging hooks 7 which are integrally formed on the longitudinal members 4 and serve to hook into the insert parts 17 of the front receiving regions 10 of the top wall 2. A rear transverse member extends between the rear end regions of the longitudinal members 4 above the plastic tray 3 and is likewise fixedly connected to said longitudinal members 4. The rear fastening means 8 are arranged on the frame module 4 to 6 in the region of the rear transverse member 5, said rear fastening means 8 being embodied as clamping elements in the form of bayonet connection parts. Each clamping element 8 is provided at its lower side with a hand grip and at its upper side with a radially projecting eccentric peg. In order to be able to fasten the frame module, including the guide rail arrangements 16 and the plastic tray 3 which is fastened thereto, to the lower side of the top wall 2, the entire unit is initially aligned upwards at an angle from the luggage space in such a way that the hanging hooks 7 can be inserted into corresponding insertion slots 18 of the insert parts 17 of the front receiving regions 10. Inclined centering faces 22 on the insert part 17 serve as insertion aids for the hanging hooks 7. Once the hanging hooks 7 have been guided up through the insertion slots 18, the hanging hooks slide, between two centering lobes in each insert part 17, over a shoulder 19 and engage over said shoulder at the front edge region of the insertion web 21. During the insertion process in the region of the hanging hooks 7, the rest of the frame module 4 to 6 is pivoted upwards in its rear region, whereby the eccentric peg or eccentric cam of the clamping elements 8 can be passed, in their dismounting position, through the oval rear receiving regions 9 of the top wall 2. By simply rotating the operating handles, the eccentric pegs are clamped against a respective corresponding run-on slope in the region of the upper side of the top wall, and thus positively lock the frame module 4 to 6 to the lower side of the top wall 2. The stowage device and thus the frame module 4 to 6 are dismounted in a correspondingly reversed manner, by virtue of the fact that the clamping elements 8 are initially released by rotating the operating handles, so that the clamping elements 8 can be guided downwards out of the rear receiving regions 9. The hanging hooks 7 are subsequently removed again from the front receiving regions 10 and out of the front insert parts 17.

As can be seen from FIGS. 1 to 3, the plastic tray 3 is supported at its opposing lateral edge regions on in each case one guide rail arrangement 16 and is fastened to correspondingly moveable rail parts by means of the fastening elements 12 which are preferably embodied as screw elements. Each guide rail arrangement 16 is composed of a plurality of rail parts which can be extended telescopically and are preferably mounted by means of rolling or sliding bearings such that they are displaceable relative to one another, preferably without play. The plastic tray 3 is provided with a plurality of longitudinally and transversely running ribs 11 which are provided in the base region of the plastic tray 3 and run as far as into the upwardly disposed wall region of the plastic tray 3. The ribs 11 are preferably integrally formed in the plastic tray 3 by corresponding swaging processes.

A transversely running rear wall region of the plastic tray 3 is provided with an end faceplate 14 which is integrally formed with the plastic tray 3, said end faceplate 14 being provided with a cut-out region 13 which is open in the manner of a passage from the top to the bottom. The cut-out region 13 is open to the top and to the bottom and has a free horizontal cross-section which corresponds at least to a base area of a luggage space lamp 15 which is integrated into the top wall 2. In the mounted position of the frame module 4 to 6 and in the closed rest position of the stowage device, in which, as per FIGS. 1 and 2, the plastic tray 3 is pushed forward into the luggage space as far as a front end stop, the cut-out region 13 is vertically aligned with the luggage space lamp 15. The light of the luggage space lamp 15 can therefore shine through the cut-out region 13 into the luggage space region situated below. When the plastic tray is in the rest position, the illumination of the luggage space by the luggage space lamp 15 is therefore not adversely affected. Once the plastic tray has been pulled out rearwards into its open stowage position as per FIG. 3, the luggage space lamp 15 illuminates the interior of the plastic tray 3. As a result, additional illumination for the stowage device and therefore in particular for the interior of the plastic tray 3 is not required.

The end faceplate 14 is embodied to include the cut-out region 13 in such a way that a recessed grip or a handle cut-out is formed in the region of the end faceplate 14 and/or in the cut-out region 13, said recessed grip or handle cut-out allowing the plastic tray 3 to be manually gripped in order to pull it out or push it in.

The invention claimed is:

1. A stowage device for a luggage space of a motor vehicle having a container which is mounted such that it is moveable by guide means between a rest position and a stowage position, wherein the guide means and the container are arranged on a frame module which can be detachably mounted on a wall section of the luggage space by fastening means which can be operated without tools, and wherein the fastening means have a plurality of fastening elements which are spaced apart from one another and comprise at least one hanging hook and at least one clamping element, in particular a bayonet connection part.

2. The stowage device as claimed in claim 1, wherein two hanging hooks are provided as a front fastening element pair and two in particular rotatable clamping elements are provided as a rear clamping element pair, said hanging hooks and clamping elements being designed such that fixing is provided without play in the mounted position.

3. The stowage device as claimed in claim 2, wherein the frame module has a framework composed of two longitudinal members, on which the guide rail arrangements are provided, and of two transverse members, which are arranged in the region of the front fastening element pair and in the region of the rear clamping element pair.

4. A stowage device for a luggage space of a motor vehicle having a container which is mounted such that it is moveable by guide means between a rest position and a stowage position, wherein the guide means and the container are arranged on a frame module which can be detachably mounted on a wall section of the luggage space by fastening means which can be operated without tools, and wherein said wall section is a top wall of the luggage space, to which the frame module can be fastened from below.

5. The stowage device as claimed in claim 4, wherein receiving regions are provided in the top wall, into which receiving regions the fastening means can be anchored in a positive-fitting manner.

6. The stowage device as claimed in claim 4, wherein the guide means are designed as telescopically extendable guide rail arrangements.

7. The stowage device as claimed in claim 4, wherein a luggage space lamp, which illuminates the interior of the container when the container has been moved into the stowage position, is provided in the region of the top wall.

8. The stowage device as claimed in claim 7, wherein the container is provided with a cut-out region which, when the container is in the rest position, is positioned in alignment below the luggage space lamp in such a way that the light of the luggage space lamp shines down through the cut-out region into the luggage space.

9. The stowage device as claimed in claim 4, wherein the container is designed as a plastic tray which is provided, at least in its base region, with a plurality of transversely and longitudinally running ribs.

10. The stowage device as claimed in claim 9, wherein a cut-out region is arranged in a plastic tray edge region which is at the front in the pulling-out direction, and wherein the cutout region comprises a handle region for manually gripping the plastic tray.

11. The stowage device as claimed in claim 9, wherein the plastic tray is provided at the front with an end faceplate which is an integral part of the plastic tray.

* * * * *